United States Patent
Hsueh et al.

(10) Patent No.: US 11,801,504 B2
(45) Date of Patent: Oct. 31, 2023

(54) HYDROPHILIC PHOSPHORUS LIGAND AND METHOD FOR SEPARATION AND RECOVERY OF CATALYST

(71) Applicant: Industrial Technology Research Institute, Hsinchu (TW)

(72) Inventors: Mao-Lin Hsueh, Tainan (TW); Yi-Zhen Chen, Tainan (TW); Kuo-Chen Shih, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 17/861,268

(22) Filed: Jul. 11, 2022

(65) Prior Publication Data

US 2023/0249171 A1     Aug. 10, 2023

Related U.S. Application Data

(60) Provisional application No. 63/294,850, filed on Dec. 30, 2021.

(51) Int. Cl.

| | |
|---|---|
| *B01J 38/62* | (2006.01) |
| *B01J 23/46* | (2006.01) |
| *B01J 23/96* | (2006.01) |
| *C07F 9/50* | (2006.01) |
| *C07F 15/00* | (2006.01) |
| *B01J 38/02* | (2006.01) |

(52) U.S. Cl.
CPC ............. *B01J 38/62* (2013.01); *B01J 23/464* (2013.01); *B01J 23/96* (2013.01); *B01J 38/02* (2013.01)

(58) Field of Classification Search
CPC .......... B01J 38/62; B01J 23/464; B01J 23/96; C07F 9/5022; C07F 15/008
See application file for complete search history.

(56) References Cited

U.S. PATENT DOCUMENTS

| | | | |
|---|---|---|---|
| 4,021,463 A | 5/1977 | Kummer et al. | |
| 4,196,096 A | 4/1980 | Dawes et al. | |
| 4,242,274 A | 12/1980 | Taylor | |
| 4,374,278 A | 2/1983 | Bryant et al. | |
| 4,400,547 A | 8/1983 | Dawes et al. | |
| 4,710,587 A | 12/1987 | Bryant et al. | |
| 5,290,743 A | 3/1994 | Chang | |
| 5,395,979 A | 3/1995 | Deckman et al. | |
| 5,681,473 A | 10/1997 | Miller et al. | |
| 6,365,782 B1 | 4/2002 | Nakamura et al. | |
| 7,015,362 B2 | 3/2006 | Lappe et al. | |
| 11,033,890 B2 | 6/2021 | Bigi et al. | |

FOREIGN PATENT DOCUMENTS

| | | |
|---|---|---|
| CN | 1240657 | 2/2006 |
| CN | 101723814 | 12/2012 |
| CN | 10290872 | 9/2019 |
| FR | 2677985 | 12/1992 |
| JP | 2007119364 | 5/2007 |
| TW | I722455 | 3/2021 |
| WO | 9302024 | 4/1993 |

OTHER PUBLICATIONS

Daniel Peral et al., "Strong π-acceptor sulfonated phosphines in biphasic rhodium-catalyzed hydroformylation of polar alkenes", Catalysis Science & Technology, Aug. 12, 2015., pp. 1-11.

Zilin Jin et al., "Thermoregulated phase transfer ligands and catalysis. I. Synthesis of novel polyether-substituted triphyenylphosphines and application of their rhodium complexes in two-phase hydroformylation", Journal of Molecular Catalysis A: Chemical, Feb. 24, 1997., pp. 55-58.

"Notice of allowance of Taiwan Counterpart Application", dated Nov. 1, 2022, p. 1-p. 3.

*Primary Examiner* — Sikarl A Witherspoon
(74) *Attorney, Agent, or Firm* — JCIPRNET

(57) ABSTRACT

Provided is a hydrophilic phosphorus ligand with the structure of formula 1.

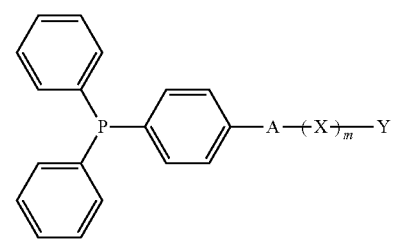

(Formula 1)

X is

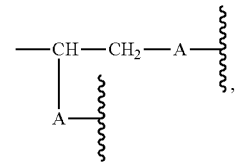

Y is

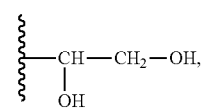

m is an integer from 1 to 20, A independently is *—O($CH_2$)$_n$—, n is an integer from 1 to 5, * — is a bond close to triphenylphosphine, and — is a bond away from triphenylphosphine.

18 Claims, 4 Drawing Sheets

HYDROPHILIC PHOSPHORUS LIGAND AND METHOD FOR SEPARATION AND RECOVERY OF CATALYST

CROSS-REFERENCE TO RELATED APPLICATION

This application claims the priority benefit of U.S. provisional application Ser. No. 63/294,850, filed on Dec. 30, 2021. The entirety of the above-mentioned patent application is hereby incorporated by reference herein and made a part of this specification.

TECHNICAL FIELD

The technical field relates to a hydrophilic phosphorus ligand and a method for separation and recovery of catalyst.

BACKGROUND

Due to the high boiling point of olefin, the separation of olefin from the catalyst by reduced pressure distillation requires a higher temperature environment. In this high temperature environment, the rhodium catalyst is unstable and prone to decomposition, so a lot of research has focused on other milder purification work, such as solvent extraction.

Various processes have been developed for rhodium catalyst recovery after hydroformylation reaction. The hydroformylation process separates the catalyst by extraction. However, the separation effect is not good and the partition coefficient of the product in the extracted solvent is low.

SUMMARY

According to embodiments of the disclosure, a hydrophilic phosphorus ligand is provided. The hydrophilic phosphorus ligand have a structure of formula 1, (Formula 1)

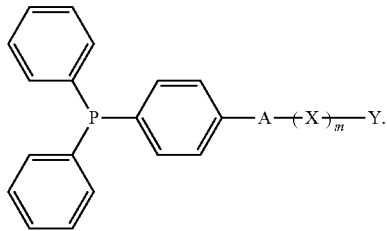

X is

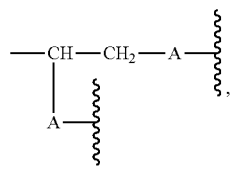

Y is

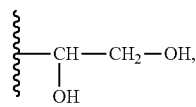 [SMILES: *C(O)CO]

m is an integer of 1 to 20, A is independently *—O(CH$_2$)$_n$—, n is an integer of 1 to 5, *— is a bond close to triphenylphosphine, and — is a bond away from triphenylphosphine.

According to embodiments of the disclosure, a method for separation and recovery of metal catalyst is provided and the method includes the followings. A solution with two phases including a first layer of the solution and a second layer of the solution is provided. The first layer of the solution includes a (rhodium) metal catalyst and a hydrophilic phosphorus ligand including the aforementioned hydrophilic phosphorus ligand. The second layer of the solution includes a reactant. Next, a chemical reaction is carried out to transfer the rhodium metal catalyst and the hydrophilic phosphorus ligand from the first layer of the solution to the second layer of the solution, and to make the reactant to react in the presence of the metal catalyst and the hydrophilic phosphorus ligand to form a product in the second layer of the solution. A separation process is carried out by cooling down the solution to transfer the metal catalyst and the hydrophilic phosphorus ligand from the second layer of the solution to the first layer of the solution, the product remaining in the second layer of the solution.

Several embodiments accompanied with figures are described in detail below to further describe the disclosure in details.

BRIEF DESCRIPTION OF THE DRAWING

The accompanying drawings are included to provide further understanding, and are incorporated in and constitute a part of this specification. The drawings illustrate and, together with the description, serve to explain the principles of the disclosure.

DETAILED DESCRIPTION

Figure 1C:
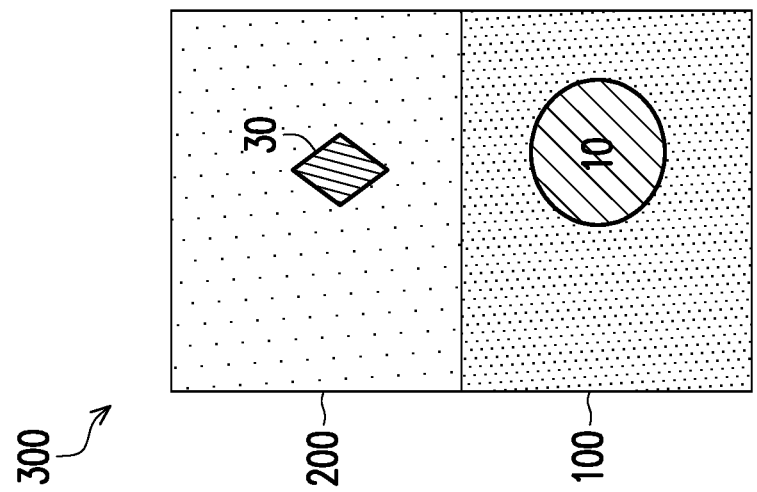
FIG. 1A to FIG. 1C show schematic diagrams of the disclosure using a hydrophilic phosphorus ligand to assist in recovery of a metal catalyst.

The combined catalyst formed by the hydrophilic phosphorus ligand and the metal catalyst of the disclosure may enhance the catalytic activity and conversion rate of chemical reactions. In addition, by changing the temperature, the hydrophilic phosphorus ligand of the disclosure may separate the metal catalyst from the products, making it possible to reuse the metal catalyst with a very high recovery rate, thus reducing the cost of the process.

The disclosure provides a hydrophilic phosphorus ligand capable of forming a combined catalyst with a metal catalyst (e.g., a rhodium catalyst). The combined catalyst may be used in chemical reactions, such as olefin hydroformylation, where the hydrophilic phosphorus ligand may be soluble in polar water, allowing the metal catalyst to be carried into aqueous phase and an aldehyde product to be retained in a low-polarity organic solution, thus allowing efficient separation of the product and recycling of the catalyst. At the same time, a recovered aqueous layer of rhodium catalyst may be reused in the hydroformylation process, thus reducing the cost of the catalyst in the process.

The hydrophilic phosphorus ligand according to embodiments of the disclosure has a structure of formula 1, (Formula 1)

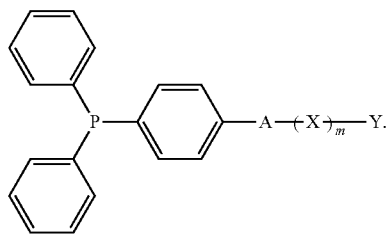

X is

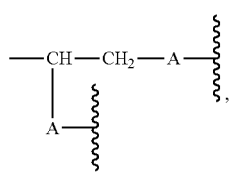

Y is

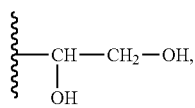

m is an integer of 1 to 20, A is independently *—O(CH$_2$)$_n$—, n is an integer of 1 to 5, *— is a bond close to triphenylphosphine, and — is a bond away from triphenylphosphine. If n is greater than 5, reactivity of hydroxy epoxide monomer ring opening polymerization may become poor, and the hydrophilic phosphorus ligand is difficult to prepare.

According to embodiments of the disclosure, the hydrophilic phosphorus ligand may be

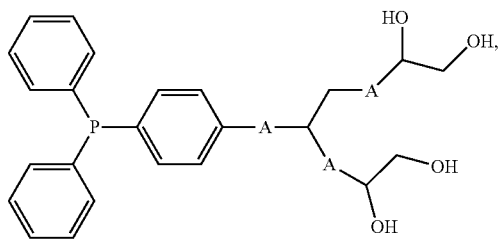

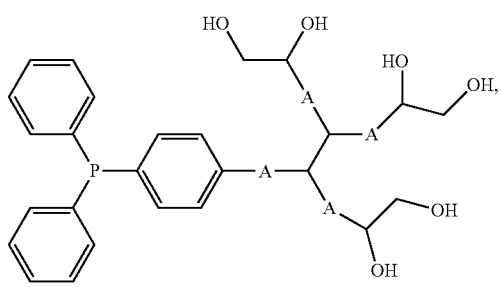

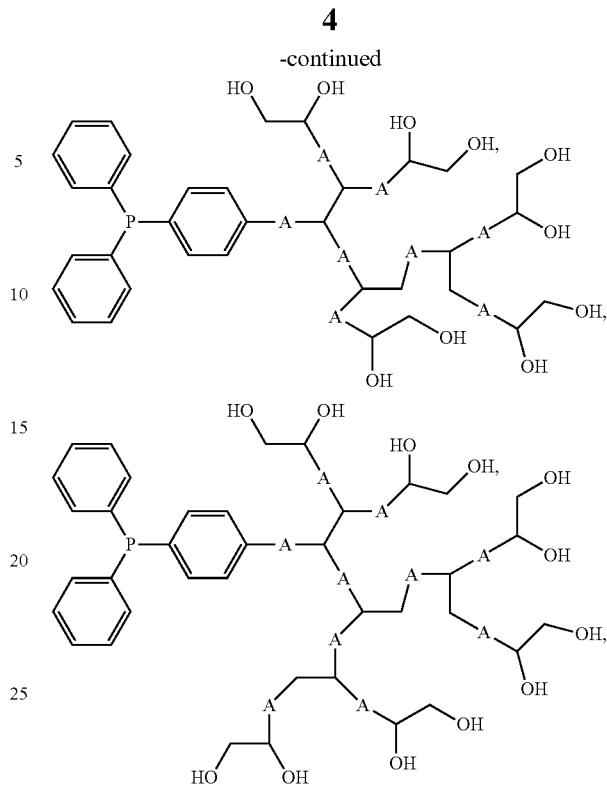

and the like. The hydrophilic phosphorus ligand may be abbreviated as PPh$_3$-PGC. The weight average molecular weight of PPh$_3$-PGC is, for example, 500 g/mol to 50,000 g/mol. If the weight average molecular weight is lower than 500 g/mol, PPh$_3$-PGC will be highly soluble in organic solvents and difficult to enter the aqueous phase to achieve a separation effect. If the weight average molecular weight is higher than 50,000 g/mol, PPh$_3$-PGC will be highly soluble in the aqueous phase and difficult to enter organic phase for reaction, resulting in poor conversion rate of catalytic reaction.

The hydrophilic phosphorus ligand PPh$_3$-PGC according to embodiments of the disclosure may be formed by various means. For example, an example of the hydrophilic phosphorus ligand PPh$_3$-PGC may be synthesized by the following formula 2 and formula 3, but not limited thereto.

(Formula 2)

4-Iodophenol (IP)

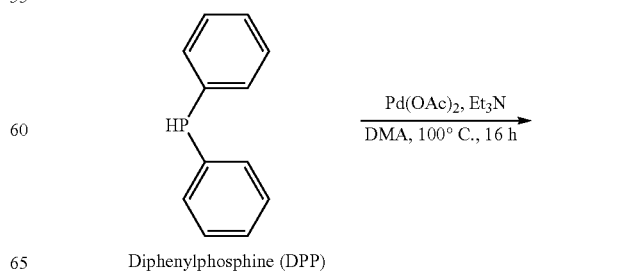

Diphenylphosphine (DPP)

-continued

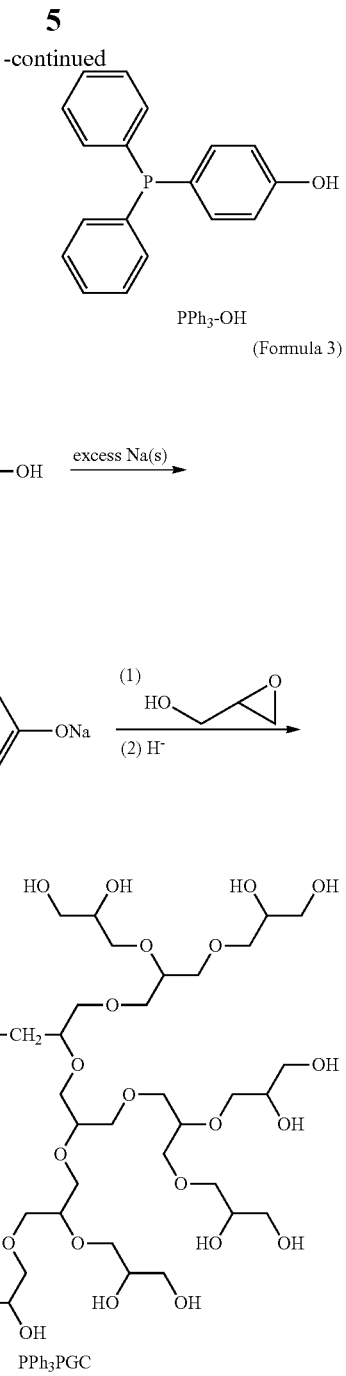

PPh₃-OH (Formula 3)

PPH₃-OH $\xrightarrow{\text{excess Na(s)}}$ PPH₃-ONa $\xrightarrow[\text{(2) H}^-]{\text{(1) HO}\triangle\text{O}}$ PPh₃PGC The hydrophilic phosphorus ligand PPh₃-PGC according to embodiments of the disclosure may form a combined catalyst with the metal catalyst for application in various chemical processes. The metal catalyst is, for example, a rhodium catalyst, a ruthenium catalyst, an iridium catalyst, or a cobalt catalyst or the like. For example, the rhodium catalyst is a rhodium compound which may be $RhCl_3 \cdot xH_2O$, dicarbonyl acetylacetone rhodium (I) $(Rh(acac)(CO)_2)$, $(RhCl(CO)_2)_2$, carbonyl rhodium $(Rh_6(CO)_{16}$ or $Rh_4(CO)_{12})$, rhodium(III) nitrate $(Rh(NO_3)_3)$, or other suitable rhodium compounds. Here, x represents a number of water of crystallization, and range of x is, for example, 0 to 3.

The composition formed by the hydrophilic phosphorus ligand PPh₃-PGC and the metal catalyst may be used in the chemical process (reactions) such as high carbon olefin hydroformylation, hydrogenation, telomerization, C-C coupling, and isomerization.

The presence of the hydrophilic phosphorus ligand PPh₃-PGC according to embodiments of the disclosure facilitates recovery of the metal catalyst. The following is an example to of the combined catalyst formed by the hydrophilic phosphorus ligand PPh₃-PGC and the rhodium catalyst for the high carbon olefin hydroformylation process.

First, the rhodium catalyst and the hydrophilic phosphorus ligand PPh₃-PGC are provided. According to some embodiments, the molar ratio of the rhodium catalyst to the hydrophilic phosphorus ligand PPh₃-PGC is between 1 and 300. When the molar ratio of the rhodium catalyst to the hydrophilic phosphorus ligand PPh₃-PGC is less than 1, reaction selectivity is poor, resulting in decreased stability of the catalyst, easy deactivation, and increased side reactions. When the molar ratio of the rhodium catalyst to the hydrophilic phosphorus ligand PPh₃-PGC is greater than 300, catalytic activity of the catalyst decreases and the conversion rate of the reaction is poor, leading to a decrease in process yield. According to other embodiments, the molar ratio of the rhodium catalyst to the hydrophilic phosphorus ligand PPh₃-PGC is 1:10 to 1:150.

The rhodium catalyst and the hydrophilic phosphorus ligand PPh₃-PGC are provided in a process solution to form a catalyst solution. The process solution of the high carbon olefin hydroformylation process includes a solution with two phases, which includes a low-polarity organic phase and a high-polarity aqueous phase. Here, low-polarity is defined as polarity less than 1; high-polarity is defined as polarity equal to 1 or greater than 1. The low-polarity organic phase solution of choice may be alkanes, cycloalkanes, benzenes, other low-polarity solvents, or co-solvents composed thereof. Candidates for the high-polarity aqueous phase solution includes water or more hydrophilic additives, such as polyethylene glycol, polypropylene glycol, or low-carbon alcohols. According to some embodiments, concentration of the rhodium catalyst is between 10 ppm and 1000 ppm. According to other embodiments, the concentration of the rhodium catalyst is 100 ppm to 600 ppm. When the concentration of the rhodium catalyst is less than 10 ppm, the reactivity is poor and the conversion rate and the yield decrease. When the concentration of the rhodium catalyst is greater than 1000 ppm, initial reaction is too fast, resulting in abnormal temperature rise of the process and increased side reactions.

After the rhodium catalyst solution is formed, the olefin compound is added to the rhodium catalyst solution and placed in an autoclave. A carbon number of the olefin compound may be an alkyl or aryl olefin compound having 2 to 15 carbon atoms. The olefin may have a single carbon-carbon double bond or multiple carbon-carbon double bonds. Olefins having multiple carbon-carbon double bonds may include dicyclopentadiene (DCPD), tricyclopentadiene (TCPD), dicyclohexadiene (DCHD), cyclohexene-1-carbaldehyde (CHCA), or other suitable cycloalkenes.

Olefin compound is converted to aldehyde compound through a hydroformylation, which is carried out under high pressure by passing gases, such as hydrogen and carbon monoxide. The aldehyde compound formed includes aldehyde compound having carbon numbers of 2 to 17.

According to some embodiments, the molar ratio of the hydrogen to the carbon monoxide is between 1:10 and 10:1. According to other embodiments, the molar ratio of the hydrogen to the carbon monoxide is between 3:1 and 1:3. According to some embodiments, the hydroformylation is carried out at a temperature between about 50° C. and 160° C. According to other embodiments, 70° C. to 140° C. According to some embodiments, the pressure is about 0.5 MPa to 15 MPa, and according to other embodiments, the pressure is about 2 MPa to 10 MPa.

After the hydroformylation is completed, the mixture of the rhodium catalyst solution and the aldehyde compound is set aside until the mixture solution separates into two layers of solution. One layer of the solution includes mainly the rhodium catalyst, the hydrophilic phosphorus ligand, and a polar aqueous solution; the other layer of the solution is mainly the aldehyde compound and the low-polarity organic solution. Pressure range for the separation is between normal pressure and 10 MPa, and temperature range is between 0° C. and 100° C.

Depending on a structure of the olefin, the product may be a mono-aldehyde compound or a poly-aldehyde compound. Formylation reaction of DCPD, TCPD, DCHD, CHCA, and several cyclic olefins forming cycloalkanal is shown in formula 4 to formula 11.

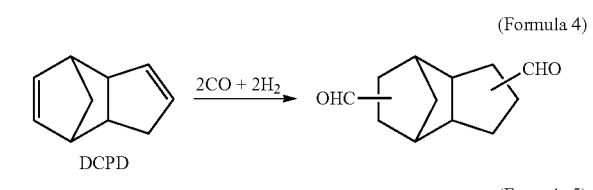
(Formula 4)

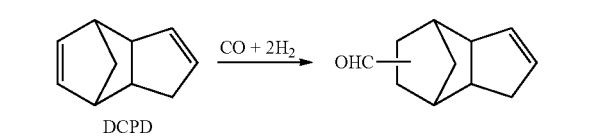
(Formula 5)

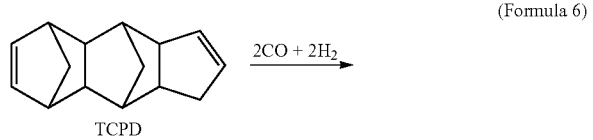
(Formula 6)

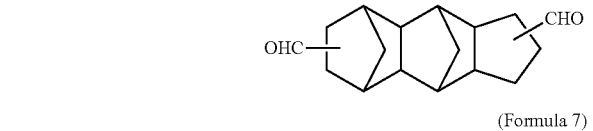
(Formula 7)

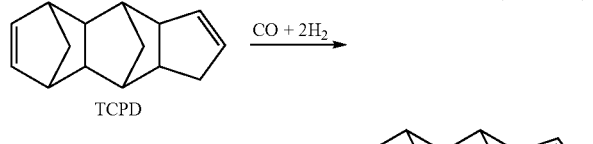
(Formula 8)

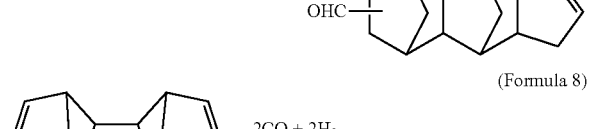

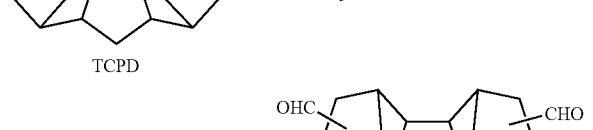

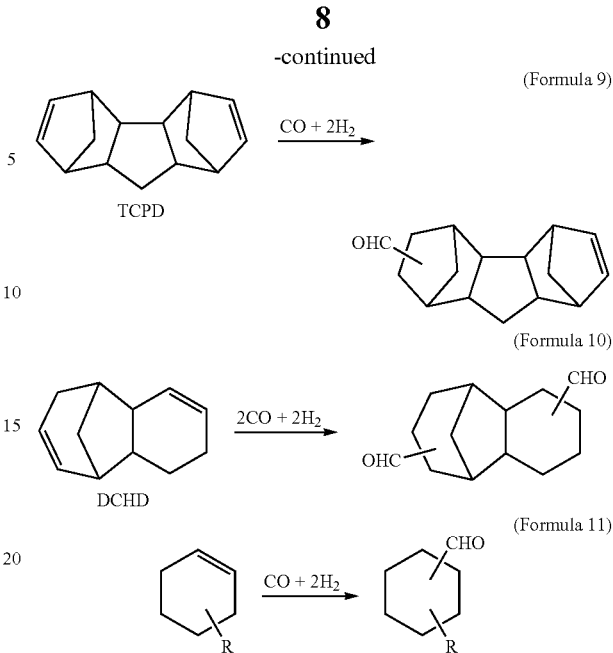

R may be an alkyl group or a substituent including a functional group such as an alcohol group, an aldehyde group, or a carboxylic acid group.

Additional low-polarity organic solvent may be added to improve catalytic separation efficiency when two-phase separation is carried out. Then, the two layers of the solution are separated, which completes the separation of the aldehyde product and the rhodium catalyst solution. The separated rhodium catalyst solution layer may be added with fresh olefin and organic solution for the hydroformylation process. The method may solve a problem of recycle of the rhodium catalyst, and effectively separate high boiling point aldehyde products and the rhodium catalyst solution.

Figure 1B:
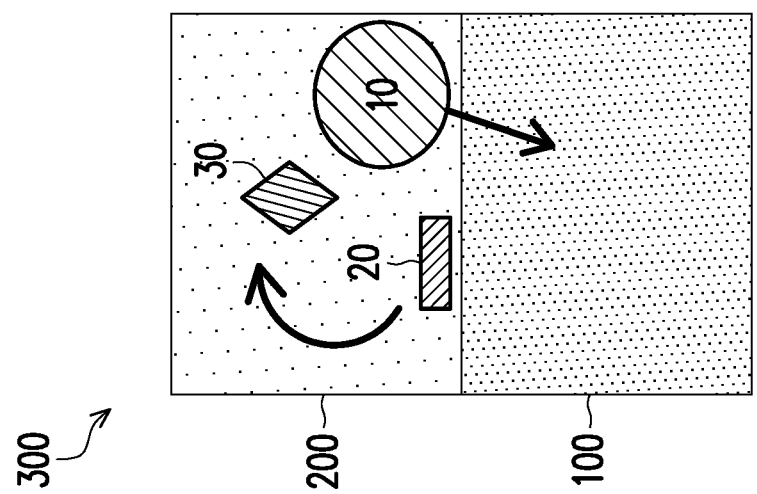
Figure 1A:
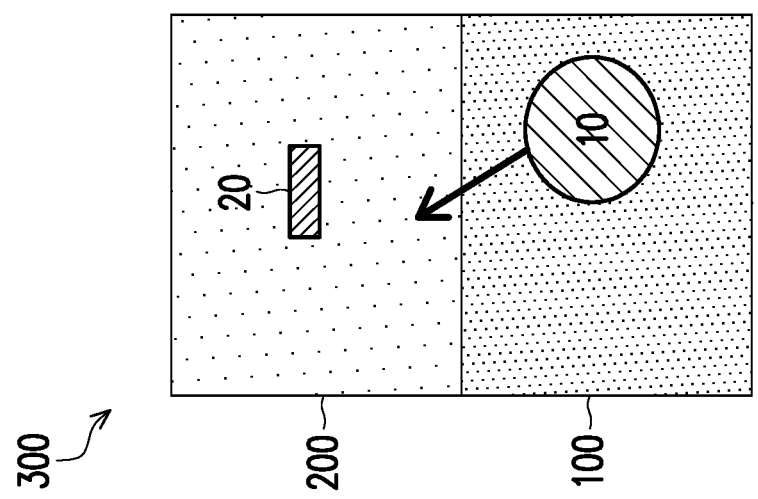
Figure 2A:
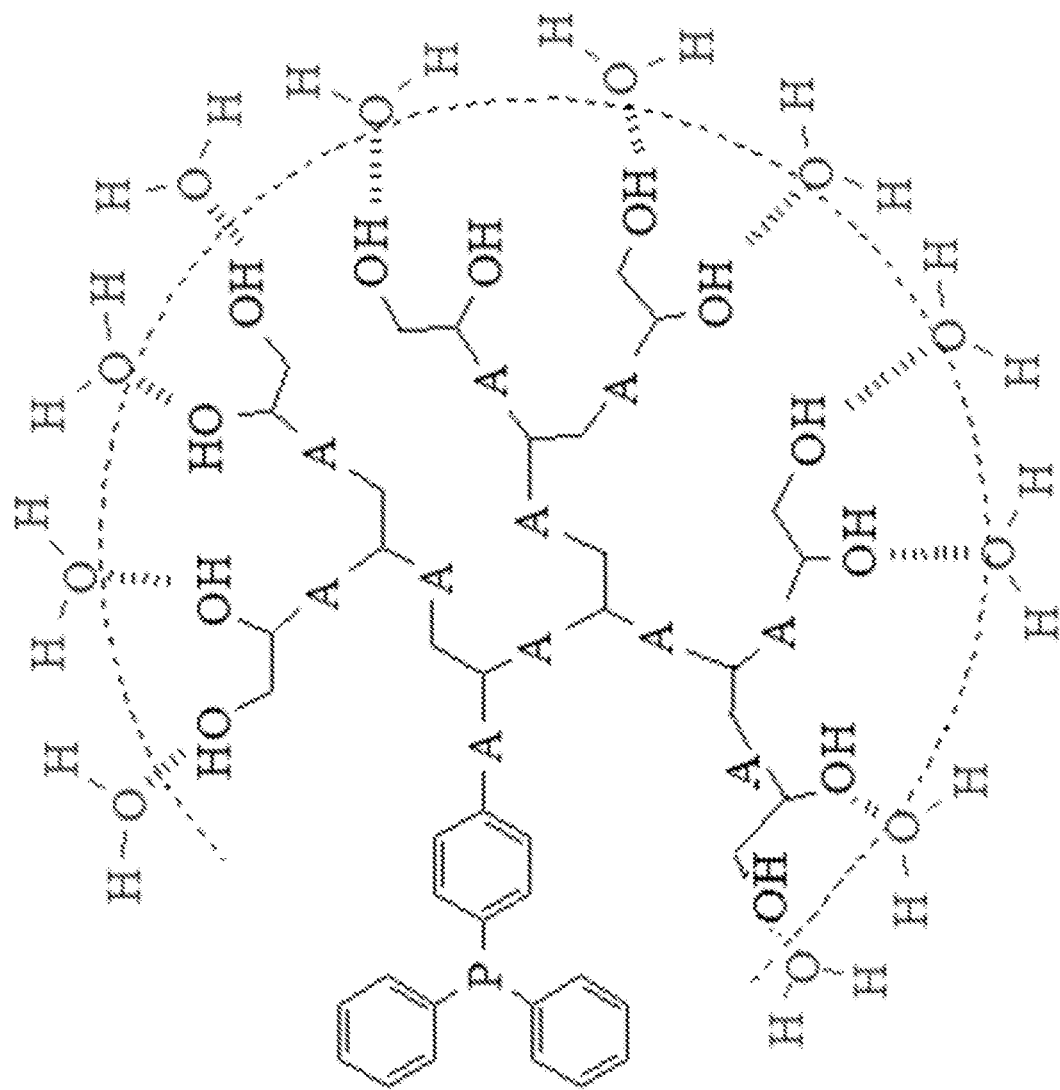
FIG. 2A to FIG. 2C show schematic diagrams of a combined catalyst of a metal catalyst and a hydrophilic phosphorus ligand in various stages.
Figure 2B:
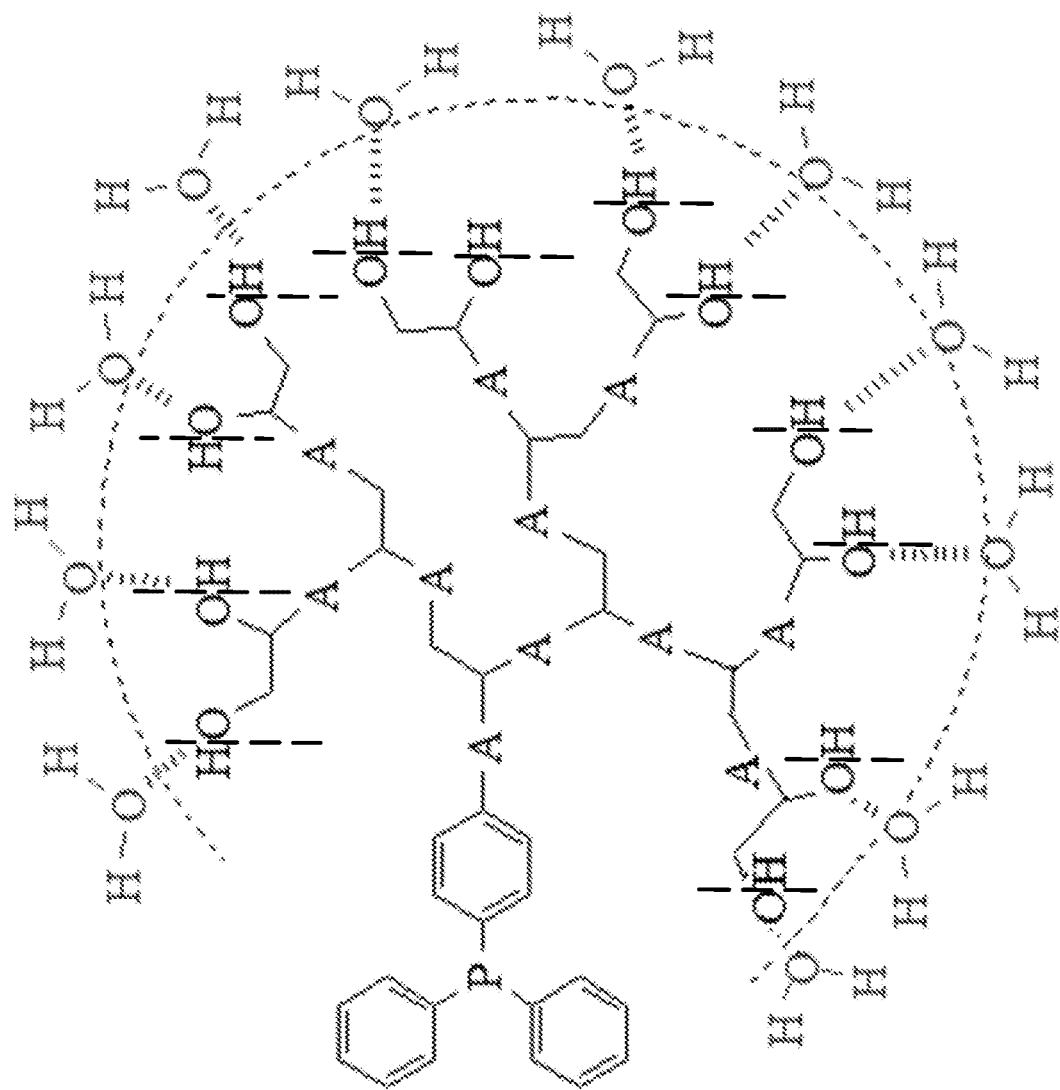
Figure 2C:
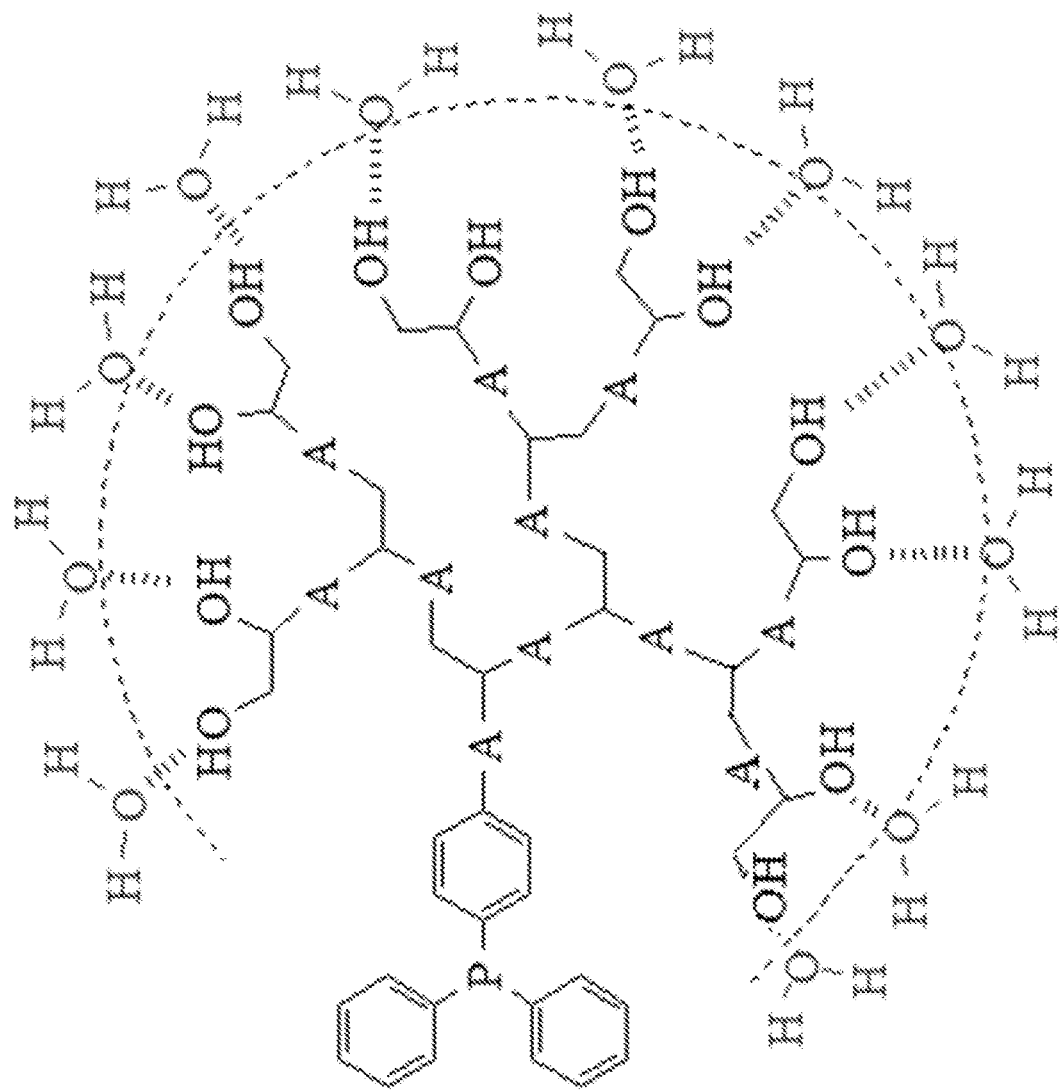

FIG. 1A to FIG. 1C show schematic diagrams of the disclosure using a hydrophilic phosphorus ligand to assist in recovery of a metal catalyst. FIG. 2A to FIG. 2C show schematic diagrams of a combined catalyst of a metal catalyst and a hydrophilic phosphorus ligand in various stages.

Referring to FIG. 1A, a process solution 300 is a solution with two phases, including a first layer of the solution 100 and a second layer of the solution 200. Polarity of the first layer of the solution 100 is higher than polarity of the second layer of the solution 200. The first layer of the solution 100 is, for example, water, polyethylene glycol, polypropylene glycol, an alcohol compound having a carbon number less than or equal to 4, or a combination thereof. The second layer of the solution 200 includes an organic solvent, such as alkanes, cycloalkanes, benzenes, other solvents with polarity lower than water, or co-solvents composed thereof.

Referring to FIG. 1A and FIG. 2A, before reaction, a combined catalyst 10 of the metal catalyst and the hydrophilic phosphorus ligand is dissolved in the first layer of the solution 100 because the hydrophilic phosphorus ligand PPh$_3$-PGC may form a hydrogen bond with the water in the first layer of the solution 100. Since a first chemical (or reactant, e.g., olefin) 20 has a higher carbon number and is less polar, it dissolves in the less polar second layer of the solution (organic layer) 200.

Referring to FIG. 1B and FIG. 2B, the temperature is raised to carry out a chemical reaction (e.g., a hydroformylation chemical reaction). When the temperature rises to a certain value such as cloud point (Cp), the hydrogen bond in the hydrophilic phosphorus ligand PPh$_3$-PGC is broken, a non-ionic surface loses its hydrophilic nature, thus after mixing the two layers of solution, the insoluble combined catalyst 10 moves into the non-polar layer (i.e., the second layer of the solution 200), and the catalytic reaction is carried out. That is, the combined catalyst 10 formed by the hydrophilic phosphorus ligand and the metal catalyst may move from the first layer of the solution 100 to the second layer of the solution 200, and the first chemical (e.g., olefin) 20 is reacted in the presence of the combined catalyst 10 formed by the hydrophilic phosphorus ligand and the metal catalyst, and a second chemical (or product, e.g., an aldehyde compound) 30 is formed in the second layer of the solution 200.

Referring to FIG. 1C and FIG. 2C, the temperature is lowered after the reaction. After cooling down, the surface of the hydrophilic phosphorus ligand becomes hydrophilic again due to hydrogen bond formation and thus moves again to the aqueous layer (i.e., the first layer of the solution 100). That is, the combined catalyst 10 of the metal catalyst and the hydrophilic phosphorus ligand may move from the second layer of the solution 200 to the first layer of the solution 100 and thus may be separated from the second chemical (or product, e.g., an aldehyde compound) 30 which remains in the second layer of the solution 200.

The hydrophilic phosphorus ligand according to embodiments of the disclosure may form a combined catalyst 10 with a metal catalyst. The insoluble combined catalyst 10 may move from the aqueous phase to the organic phase during the heating process, and again into in the aqueous layer during the cooling process. By changing the temperature, the metal catalyst may be separated from the product, and the metal catalyst may be recycled and reused.

Example 1: Synthesis of hydrophilic phosphorus ligand PPh$_3$-PGC (4-Hydroxyphenyl) diphenylphosphine (TPPOH, 8.45 g, 0.030 mol) and excess sodium (Na, 1.61 g) were weighed and placed in a 250 mL round bottom reaction flask and stirred under nitrogen for 18 hours with de-watered and de-oxygenated THF (50 mL). A product TPPONa was obtained. The TPPONa solution was filtered and THF was removed, and dioxane (50 mL) was added as a reactive solvent to form a solution A. Another reaction flask was added with de-watered and de-oxygenated dioxane (50 mL) and hydroxy functional epoxy resin (HE) to form a solution B. The hydroxy functional epoxy resin (HE) may be tetrahydrofurfuryl alcohol (GC5). The molar ratio of tetrahydrofurfuryl alcohol GC5 (30.6 g, 29.1 mL, 0.30 mol) to TPPONa was 10. The solution B was slowly dripped into the solution A under nitrogen, and was stirred for 3 hours at room temperature for reaction. After the reaction, H$_2$O (3 mL) was added to terminate the reaction and the solution was removed to complete the synthesis of PPh$_3$-PGC. The results are shown in Table 1.

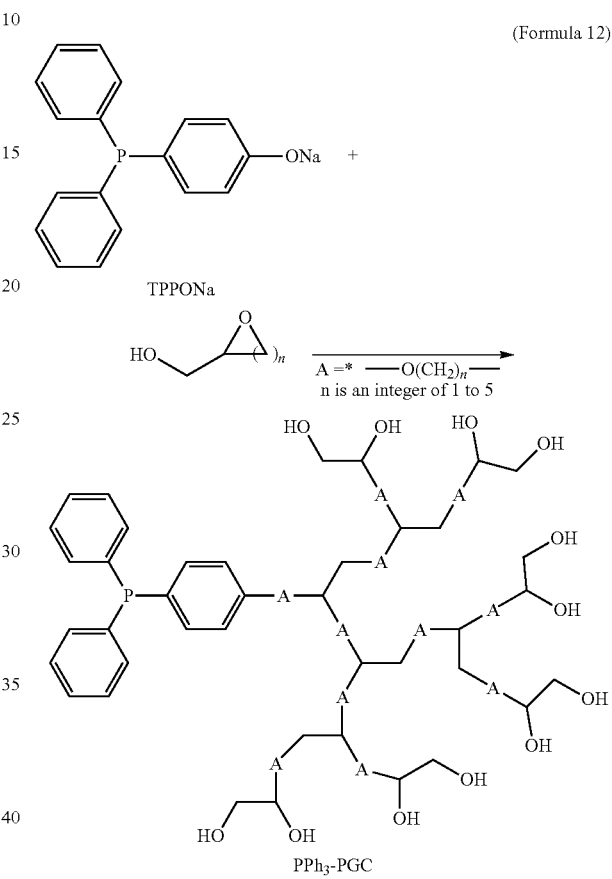

(Formula 12)

In accordance with the method, the hydroxy functional epoxy resin (HE) of the solution B was changed to GC3. The molar ratios of GC3 to TPPONa are 10 and 20, and the results are shown in Table 1.

TABLE 1

| Examples | Hydroxy functional epoxy resin (HE) | Molar ratio HE/TPPONa | Molecular weight Mn(g/mol) | Cloud point (° C.) | phosphorus ligand |
|---|---|---|---|---|---|
| 1 | GC5 | 10 | 1120 | 64 | PPh$_3$-PGC5 |
| 2 | GC3 | 10 | 580 | N.A. | PPh$_3$-PGC3 |

TABLE 1-continued

| Examples | Hydroxy functional epoxy resin (HE) | Molar ratio HE/TPPONa | Molecular weight Mn(g/mol) | Cloud point (° C.) | phosphorus ligand |
|---|---|---|---|---|---|
| 3 | 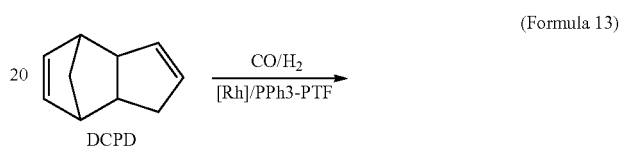 GC3 | 20 | 1650 | N.A. | PPh$_3$-PGC3 |

According to NMR results, when the hydroxy functional epoxy resin is GC5, and the molar ratio of GC5 to TPPONa is 10, the weight average molecular weight of the obtained PPh$_3$-PGC5=1120 g/mol, cloud point=64° C. When the hydroxy functional epoxy resin is GC3, and the molar ratio of GC3 to TPPONa is 10, the weight average molecular weight of the obtained PPh$_3$-PGC3=580 g/mol. When the hydroxy functional epoxy resin is GC3, and the molar ratio of GC3 to TPPONa is 20, the weight average molecular weight of the obtained PPh$_3$-PGC3=1650 g/mol. Since the cloud point has been determined to be greater than 100 degrees, which is higher than the boiling point of water, the measurement is no longer carried out.

Example 2: Hydroformylation

The rhodium catalyst Rh(acac)(CO)$_2$ (37.4 mg, 0.145 mmol) and PPh$_3$-PGC5 (0.974 g, 0.87 mmol) were weighed in a glove box, placed in a reaction flask, and stirred with cyclohexane (21 ml, deoxygenated) until the reactants completely dissolved. DCPD (38.3 g, 290 mmol) was weighed and placed in another reaction flask, cyclohexane (4 mL) was added, and nitrogen was introduced for 30 minutes to deoxygenate. The autoclave was evacuated and purged with nitrogen three times, the rhodium catalyst solution was injected into the autoclave, and H$_2$O/PEG600 (50 mL, deoxygenated) with a volume ratio of 1/1 was injected. PEG600 is polyethylene glycol (Mw=600 g/mol). After that, the DCPD solution was injected into the autoclave, the nitrogen in the autoclave was replaced with a gas mixture (H$_2$/CO=1/1) and the pressure was built up to 30 Kg/cm$^2$, and then the temperature of the autoclave was raised to 120° C. and the pressure was built up to 50 Kg/cm$^2$ for 12 hours. After the reaction, the reaction solution was cooled down to room temperature and separated into two layers to obtain sample W-9. After that, analysis was performed by gas chromatography (GC) (carvone as an internal standard).

From the results, the conversion rate of DCPD is 99.5%, the selection rate of TCD-MAL is 4.1%, and the selection rate of TCD-DAL is 95.9%. The two layers of the solution were analysed respectively. A rhodium catalyst separation rate in an upper layer solution (Cyclohexane) and a lower layer solution (H$_2$O/PEG600) was calculated as 93.9% by ICP-OES analysis. The separation rate of TCD-DAL in the upper layer solution and the lower layer solution is calculated as 98.4% by GC analysis (carvone as the internal standard), a partition coefficient of aldehyde products=61.5, and the partition coefficient (Kp) of rhodium=15.4. The partition coefficient is defined here as a result of dividing the concentration of the component in the two layers of the solution.

Example 3: Hydroformylation for combined catalysts of PPh$_3$-PGC5 with various metal catalysts Various metal catalysts Rh(acac)(CO)$_2$, RhCl$_3$, IrCl$_3$, Ru$_3$(CO)$_{12}$, RuCl$_3$ and PPh$_3$-PGC are used to form various combined catalysts. The hydroformylation was carried out by a method similar to Example 2. However, the molar ratio of DCPD: metal catalyst: PPh$_3$-PGC is 2000:1:6. Moreover, cyclohexane/H$_2$O/PEG600=1/1/1 (volume ratio). A reaction formula of the hydroformylation is shown in formula 13.

(Formula 13)

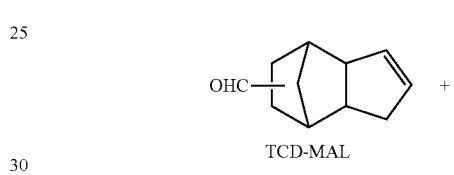

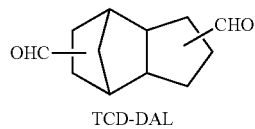

Generally, in addition to the formation of the products TCD-MAL and TCD-DAL, by-products TCD-MM, TCD-DM and H-DCPD are also formed, and their structures are shown below:

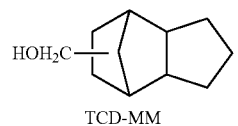

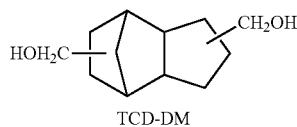

The results are shown in Table 2.

TABLE 2

| Entry | Catalyst [C] | Time (h) | Conv. of DCPD (%) | Selectivity (%) | | | | |
|---|---|---|---|---|---|---|---|---|
| | | | | TCD-MAL | TCD-DAL | TCD-MM | TCD-DM | H-DCPD |
| W-9 | Rh(acac)(CO)$_2$ | 12 | 99.5 | 4.1 | 95.9 | N.D. | N.D. | N.D. |
| 1 | RhCl$_3$ | 12 | 93.5 | 10.9 | 89.1 | N.D. | N.D. | N.D. |
| 2 | IrCl$_3$ | 24 | 54.7 | 76.6 | 23.4 | N.D. | N.D. | N.D. |
| 3 | Ru$_3$(CO)$_{12}$ | 12 | 92.0 | 11.9 | 12.2 | 23.8 | 26.8 | 25.3 |
| 4 | RuCl$_3$ | 12 | 84.5 | 9.6 | 7.1 | 29.9 | 30.5 | 22.9 |

The results in Table 2 show that the combined catalysts formed by PPh$_3$-PGC5 and various metal catalysts have high catalytic activity and high reactivity selectivity.

Example 4: Hydroformylation with various ratios of solution with two phases

A combined catalyst was formed by metal catalyst Rh(acac)(CO)$_2$ and PPh$_3$-PGC5, and the hydroformylation was carried out by the method similar to Example 2. However, the solvents used were toluene, cyclohexane, H$_2$O and PEG600 in various ratios. The results are shown in Table 3.

TABLE 3

| Entry | S/Rh/p$^a$ (by molar ratio) | Temp. (° C.) | Pressure (kg/cm$^2$)$^b$ | Solvent$^c$ | Time (h) | Conv. of DCPD (%)$^d$ | Selectivity (%) | | |
|---|---|---|---|---|---|---|---|---|---|
| | | | | | | | TCD-MAL | TCD-DAL | TCD-MM |
| W-1 | 2000/1/6 | 100 | 30 | Hexane | 5 | 97.4 | 98.1 | 1.9 | N.D. |
| W-2 | 2000/1/6 | 100 | 30 | Toluene | 5 | 96.3 | 50.6 | 49.4 | N.D. |
| W-3 | 2000/1/6 | 100 | 30 | Toluene | 7 | >99 | 45.3 | 54.7 | N.D. |
| W-4 | 2000/1/6 | 100 | 30 | Toluene | 12 | >99 | 37.1 | 62.3 | 0.6 |

| Entry | Solvent/co-solvent (w/w) | Time (h) | Conv. of DCPD (%) | Selectivity (%) | | |
|---|---|---|---|---|---|---|
| | | | | TCD-MAL | TCD-DAL | TCD-MM |
| W-5 | Toluene/H$_2$O (1/1) | 5 | 58.6 | 13.8 | 86.2 | N.D. |
| W-6 | Toluene/H$_2$O (1/1) | 12 | 99.5 | 3.6 | 96.4 | N.D. |
| W-7 | Toluene/H$_2$O (2/1) | 12 | 99.3 | 3.7 | 96.1 | 0.2 |
| W-8 | Toluene/H$_2$O/PEG (1/1/1) | 7 | 99.6 | 2.8 | 97.2 | N.D. |
| W-9 | Cyclohexane/H$_2$O/PEG (1/1/1) | 12 | 99.5 | 4.1 | 95.9 | N.D. |

$^a$S = DCPD, P = PPh$_3$-PGC5; $^b$H$_2$/CO = 1/1; $^c$Solvent/DCPD = 1/1 by w/w The results in Table 3 show that Rh(acac)(CO)$_2$/PPh$_3$-PGC5 has high catalytic activity and high conversion rate under several different types and ratios of solvents (W-1~W-9).

Example 5: Extraction method 1 (1 time more cyclohexane added)

After the reaction of Example 2, the reaction was cooled down to room temperature, 1 time more cyclohexane (25 mL, deoxygenated) was additionally added, stirred for 1 hour, and then left to stand for separation to obtain sample W-10. The rhodium catalyst separation rate between the upper layer solution (Cyclohexane) and the lower layer solution (H$_2$O/PEG600) was 97.7% by GC analysis (carvone was the internal standard), as measured by ICP-OES analysis. The separation rate of TCD-DAL in the upper layer solution and the lower layer solution was calculated as 99.0% by GC analysis (carvone as the internal standard), the partition coefficient (Kp) of aldehyde products=99, and the partition coefficient (Kp) of rhodium=42.5. The results are shown in Table 4.

Example 6: Extraction method 2 (2 times more cyclohexane added)

After the reaction of Example 2, the reaction was cooled down to room temperature, 2 times more cyclohexane (50 mL, deoxygenated) was additionally added, stirred for 1 hour, and then left to stand for solvent separation to obtain sample W-11. The rhodium catalyst separation rate between the upper layer solution (Cyclohexane) and the lower layer solution (H$_2$O)/PEG600) was 98.2% by GC analysis (carvone was the internal standard), as measured by ICP-OES analysis. The separation rate of TCD-DAL in the upper layer solution and the lower layer solution was calculated as 99.5% by GC analysis (carvone was the internal standard), the partition coefficient of aldehyde products=199, and the partition coefficient (Kp) of rhodium=54.6. The results are shown in Table 4.

TABLE 4

| | | W-9 | | W-10 | | W-11 | |
|---|---|---|---|---|---|---|---|
| | | Rh(Catalyst) | P (phosphorus ligand) | Rh(Catalyst) | P (phosphorus ligand) | Rh(Catalyst) | P (phosphorus ligand) |
| Catalyst distribution | Upper layer | 0.853 | 4.336 | 0.320 | 0.428 | 0.259 | 0.336 |

TABLE 4-continued

| (mg) | Lower layer | 13.125 | 21.222 | 13.483 | 22.798 | 14.007 | 23.151 |
|---|---|---|---|---|---|---|---|
| Rh catalyst separation rate (%) | | 93.9 | | 97.7 | | 98.2 | |

| | | TCD-MAL | TCD-DAL | TCD-MM | TCD-MAL | TCD-DAL | TCD-MM | TCD-MAL | TCD-DAL | TCD-MM |
|---|---|---|---|---|---|---|---|---|---|---|
| Product distribution | Upper layer | 4.5 | 95.5 | N.D. | 5.8 | 94.2 | N.D. | 6.3 | 93.7 | N.D. |
| | Lower layer | 0.8 | 99.2 | N.D. | 1.2 | 98.8 | N.D. | 1.3 | 98.7 | N.D. |
| TCD-DAL separation rate (%) | | | 98.4 | | | 99.0 | | | 99.5 | |

| Solvent composition | Upper layer | Cyclohexane | | | Cyclohexane | | | Cyclohexane | | |
|---|---|---|---|---|---|---|---|---|---|---|
| | Lower layer | H$_2$O/PEG600 | | | H$_2$O/PEG600 | | | H$_2$O/PEG600 | | |

The results in Table 4 show that after the reaction was cooled down to room temperature, the addition of additional solvent helped to increase the recovery to 98.2% and the partition coefficient of the product could reach 199.

Example 7: Metal catalysts recycling and reuse

The rhodium catalyst after the reaction of Example 2 was reused 1 to 4 times, and the results are shown in Table 5.

TABLE 5

| | Conv. of | Selectivity (%) | | | |
|---|---|---|---|---|---|
| Entry | DCPD (%) | TCD-MAL | TCD-DAL | TCD-MM | Note |
| W-9 | 99.5 | 4.1 | 95.9 | N.D. | |
| R-1 | 99.7 | 4.6 | 95.4 | N.D. | Reuse 1st |
| R-2 | 99.3 | 3.9 | 96.1 | N.D. | Reuse 2nd |
| R-3 | 99.5 | 4.3 | 95.6 | 0.1 | Reuse 3rd |
| R-4 | 99.3 | 4.0 | 95.9 | 0.1 | Reuse 4th |

The results in Table 5 show that by PPh$_3$-PGC5, the disclosure may make the recovered metal catalyst Rh(acac)(CO)$_2$ highly catalytic even after repeated use.

The combined catalyst formed by the hydrophilic phosphorus ligand and the metal catalyst of the disclosure may enhance the catalytic activity and conversion rate of chemical reactions. In addition, by changing the temperature, the hydrophilic phosphorus ligand of the disclosure may separate the metal catalyst from the products, making it possible to reuse the metal catalyst with a very high recovery rate, thus reducing the cost of the process. Moreover, the addition of additional solvent after the reaction helps to improve the recovery of the catalyst.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A hydrophilic phosphorus ligand having a structure of formula 1,

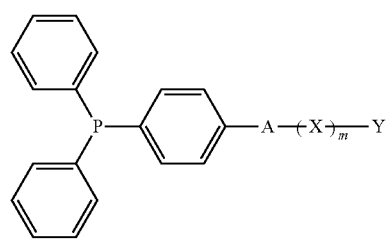

(Formula 1)

wherein X is

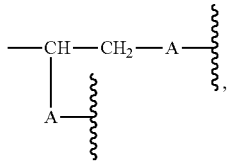

Y is

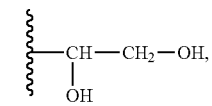

m is an integer of 1 to 20, A is independently *—O(CH$_2$)$_n$—, n is an integer of 1 to 5, *— is a bond close to triphenylphosphine, and — is a bond away from triphenylphosphine.

2. The hydrophilic phosphorus ligand according to claim 1, wherein a weight average molecular weight of the hydrophilic phosphorus ligand is 500 g/mol to 50,000 g/mol.

3. A method for separation and recovery of catalyst, comprising:
   providing a solution with two phases comprising a first layer of the solution and a second layer of the solution, wherein
   the first layer of the solution comprises a metal catalyst and a hydrophilic phosphorus ligand according to claim 1; and
   the second layer of the solution comprises a reactant, carrying out a chemical reaction to transfer the metal catalyst and the hydrophilic phosphorus ligand from the first layer of the solution to the second layer of the solution, and to make the reactant to react in the presence of the metal catalyst and the hydrophilic phosphorus ligand to form a product in the second layer of the solution; and carrying out a separation process by cooling down the solution to transfer the metal catalyst and the hydrophilic phosphorus ligand from the second layer of the solution to the first layer of the solution, the product remaining in the second layer of the solution.

4. The method for separation and recovery of catalyst according to claim 3, wherein a weight average molecular weight of the hydrophilic phosphorus ligand is 500 g/mol to 50,000 g/mol.

5. The method for separation and recovery of catalyst according to claim 3, wherein polarity of the first layer of the solution is greater than polarity of the second layer of the solution.

6. The method for separation and recovery of catalyst according to claim 5, wherein the first layer of the solution comprises water, polyethylene glycol, polypropylene glycol, an alcohol compound having a carbon number less than or equal to 4, or a combination thereof.

7. The method for separation and recovery of catalyst according to claim 5, wherein the second layer of the solution comprises an organic solvent, and the organic solvent comprises alkanes, cycloalkanes, benzenes, solvents with polarity lower than water, or co-solvents composed thereof.

8. The method for separation and recovery of catalyst according to claim 3, wherein carrying out the separation process further comprises adding an additional organic solvent.

9. The method for separation and recovery of catalyst according to claim 3, wherein the catalyst comprises a rhodium catalyst.

10. The method for separation and recovery of catalyst according to claim 9, wherein the rhodium catalyst comprises $RhCl_3 \cdot xH_2O$, dicarbonyl acetylacetone rhodium (I) $(Rh(acac)(CO)_2)$, $(RhCl(CO)_2)_2$, carbonyl rhodium $(Rh_6(CO)_{16}$ or $Rh_4(CO)_{12})$, or rhodium(III) nitrate $(Rh(NO_3)_3)$.

11. The method for separation and recovery of catalyst according to claim 3, wherein carrying out the chemical reaction comprises carrying out hydroformylation, the reactant comprises olefin, and the product comprises an aldehyde compound.

12. The method for separation and recovery of catalyst according to claim 11, wherein the olefin comprises olefin having a single carbon-carbon double bond, or olefin having a plurality of carbon-carbon double bonds, and the olefin having the carbon-carbon double bonds comprises dicyclopentadiene, tricyclopentadiene, dicyclohexadiene or cyclohexene-1-carbaldehyde.

13. The method for separation and recovery of catalyst according to claim 11, wherein the aldehyde compound comprises an aldehyde compound having a carbon number of 2 to 12.

14. The method for separation and recovery of catalyst according to claim 11, wherein carrying out the hydroformylation comprises introduction of hydrogen and carbon monoxide.

15. The method for separation and recovery of catalyst according to claim 14, wherein pressure of the introduction of hydrogen and carbon monoxide is between 0.5 MPa and 15 MPa.

16. The method for separation and recovery of catalyst according to claim 11, wherein the hydroformylation is carried out at a temperature between 50° C. and 160° C.

17. The method for separation and recovery of catalyst according to claim 3, wherein pressure range of carrying out the separation process is between normal pressure and 10 MPa.

18. The method for separation and recovery of catalyst according to claim 11, wherein a temperature at which the separation process is carried out is lower than a temperature at which the hydroformylation is carried out.

* * * * *